June 1, 1965 R. C. CORBELL ETAL 3,187,196
TRIGGER CIRCUIT INCLUDING MEANS FOR ESTABLISHING A TRIGGERED DISCRIMINATION LEVEL
Filed Jan. 31, 1961
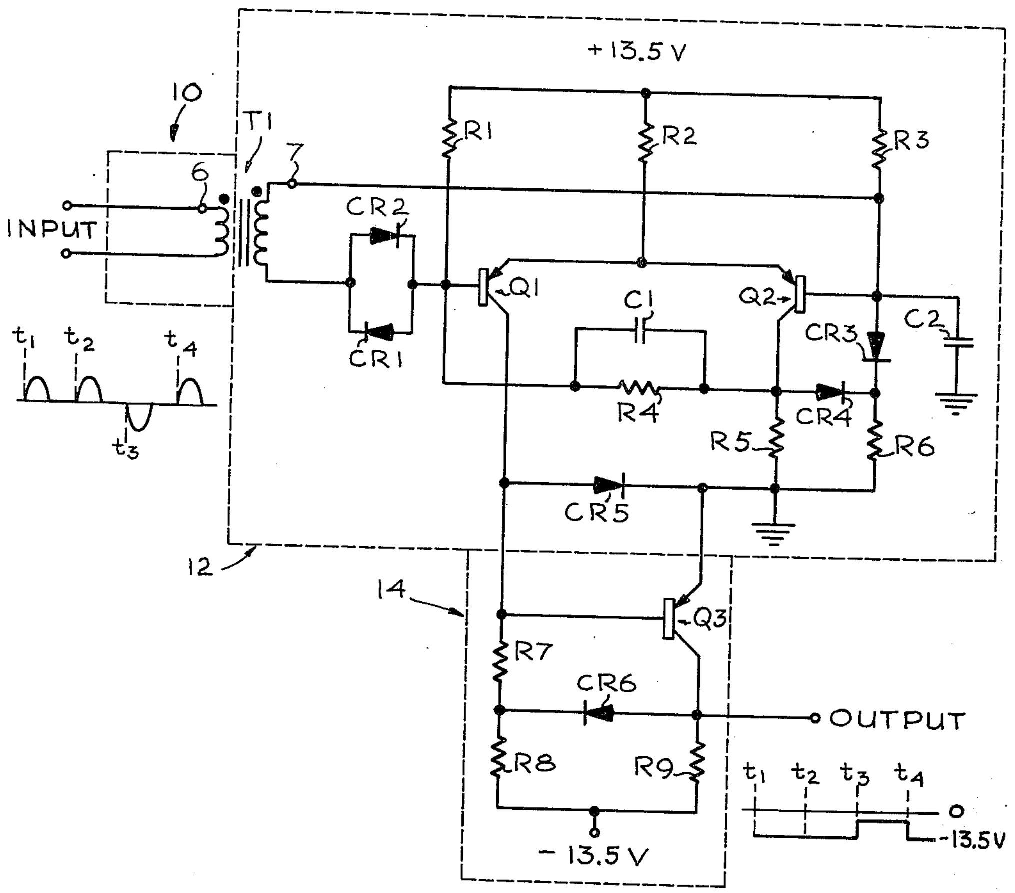
RAYMOND C. CORBELL
ROBERT N. MELLOTT
INVENTORS
BY Arthur Freilich
ATTORNEY United States Patent Office 3,187,196

Patented June 1, 1965

3,187,196

TRIGGER CIRCUIT INCLUDING MEANS FOR ESTABLISHING A TRIGGERED DISCRIMINATION LEVEL

Raymond C. Corbell, Canoga Park, and Robert N. Mellott, Northridge, Calif., assignors, by mesne assignments, to The Bunker-Ramo Corporation, Stamford, Conn., a corporation of Delaware Filed Jan. 31, 1961, Ser. No. 86,163
5 Claims. (Cl. 307—88.5)

This invention pertains generally to sense amplifiers and more particularly to a logical level sense amplifier capable of converting bipolar pulse inputs into voltage level outputs.

In electronic computers, information can be presented in many different forms at different stages of handling. For example only, information can be conveyed in the form of D.-C. logical levels or A.-C. bipolar pulses. It is often necessary to be able to convert rapidly from one form of information to another, as for instance, when transfluxors are employed. The transfluxor is a magnetic device which may be employed for switching purposes; that is, to selectively control communication between a pair of circuits. The transfluxor is essentially an A.-C. device and only current changes can be coupled through it. Therefore, in order to transfer D.-C. logical level information between a pair of circuits, via transfluxors, it is necessary to initially convert logical levels to pulses and secondly convert pulses back to logical levels.

In view of the above, it is the principal object of this invention to provide an improved circuit arrangement for converting input bipolar current pulses to voltage level outputs.

It is a further object of this invention to provide an improved logical level sense amplifier circuit which employs a minimum number of power sources and circuit elements, all of which represents conventional and standard computer equipment.

It is a still further object of this invention to provide an improved logical level sense amplifier circuit which is capable of performing at a reasonably high repetition rate and whose performance is not adversely affected by relatively extreme supply voltage variations.

It is a still further object of this invention to provide an improved logical level sense amplifier circuit having an output affected only by an appropriate triggering input pulse and not by spurious noise pulses. This feature is provided through the use of the forward voltage drop of a diode to establish a triggering discrimination level.

Briefly, the invention comprises a circuit arrangement including an input section and an output section with memory circuit means coupling said sections together for generating a first voltage level output in response to a positive pulse input and a second voltage level output in response to a negative pulse input.

More particularly, the invention comprises a bistable state circuit utilizing first and second transistors functioning as the memory of the device and a third transistor in the output section serving to isolate the memory section from the load and amplify the output of the memory section. A transformer primary winding, comprising part of the input section, couples the input pulse to its secondary, comprising part of the memory section, being connected between the bases of the first and second transistors. A voltage drop from the base of the nonconducting transistor to the base of the conducting transistor is established by current conduction through a pair of opposed paralleled diodes connected in series with the secondary between said bases. If the pulse induced in the transformer secondary by an input pulse is of opposite polarity to and of greater magnitude than said voltage drop, the memory circuit will change state. Thus, the circuit output resides at a first voltage level until caused to change level by a predetermined input pulse.

Other objects and advantages, which will subsequently become apparent, reside in the details of circuitry and operation as more fully hereinafter described and claimed, further reference being made to the accompanying drawing forming a part hereof wherein is shown a schematic wiring diagram of the logical level sense amplifier forming the present invention.

As noted, the function of the invention is to convert bipolar input pulses to logical level outputs in a manner such that a positive input pulse will cause a true logical level output and a negative input pulse will cause a false logical level output. As will be more fully hereinafter appreciated, the true logical level is represented by a voltage of −13.5 volts while the false logical level is represented by a voltage approximately at ground. The preferred circuit embodiment shown responds to all pulses whose absolute amplitude ≧0.2 volt and rejects all signals below this level. The single circuit output is capable of supplying 100 milliamps to a connected load when the circuit is in a false state.

Attention is now called to the accompanying drawing in which three distinct major sections of the circuit arrangement may be noted. The first section is the input section 10 which includes the primary winding of transformer T1 and a pair of input terminals upon which the bipolar input pulses are impressed. The second section is the bistable memory circuit 12 which includes a +13.5 volt positive potential supply and a pair of PNP transistors Q1 and Q2. The secondary winding of transformer T1 is connected in series with paralleled diodes CR1 and CR2 between the bases of transistors Q1 and Q2, thereby enabling the input section to control the mode of operation of the transistors which of course determines the state of the circuit. The third section is the output section 14 which includes a −13.5 volt negative potential and a PNP transistor Q3 connected between the negative potential and ground. A single output terminal is connected to the collector of transistor Q3. The output section 14 is coupled to the memory circuit 12 so that transistor Q3 conducts only when transistor Q1 is cut off. The conduction of transistor Q1 and nonconduction of transistors Q2 and Q3 will be considered the true state while the conduction of transistors Q2 and Q3 and nonconduction of transistor Q1 will be considered the false state.

Consider initially the memory circuit 12 when transistor Q1 is conducting. The voltage at the base of transistor Q2 is substantially fixed, being established by the voltage divider, resistors R3 and R6, connected between the positive potential source of +13.5 volts and ground. The emitter of transistor Q2 is directly connected to the emitter of transistor Q1. The current in the emitter-to-collector path of transistor Q1 causes a voltage drop across resistor R2 which reduces the voltage level of the emitters of both transistors Q1 and Q2 such that it is less than the voltage of the base of transistor Q2, thereby cutting off emitter-to-collector current in transistor Q2.

As long as transistor Q2 is cut off, the collector thereof remains at a sufficiently low voltage level, so that current passes through R4 and R5 both from the base of transistor Q1 and, at the same time, from the base of transistor Q2 through the secondary of transformer T1 and diode CR2. The current pulled from the base of transistor Q1 insures that transistor Q1 is stable in the conducting state. The current pulled from the base of transistor Q2 through the secondary of transformer T1 and diode CR2 establishes a fixed voltage drop (0.5 volt) from the base of the nonconducting transistor Q2 to the base of the conducting transistor Q1.

It is appropriate here to note that transistor Q3 forms a part of the output section 14 and does not effect the operation of the bistable memory circuit 12. As will be more fully appreciated below, transistor Q3 provides additional gain and isolation for the output signal from memory circuit 12. The conduction of transistor Q1 holds the bast of transistor Q3 at ground (due to the drop across resistors R7 and R8) thereby maintaining transistor Q3 off. Of course, with transistor Q3 cut off, there is no current flow through resistor R9 and accordingly the collector of transistor Q3 is essentially tied to the negative potential source at —13.5 volts. The output terminal tied to the collector of transistor Q3 is therefore representative of the true state.

In order to trigger the sense amplifier from the true state in which transistor Q1 is conducting, it is necessary to reverse the 0.5 volt drop between the bases of transistors Q2 and Q1. Transformer T1 is a step-up transformer having a turns ratio of 1:2.5 and having windings phased as shown by the polarity dots in the figure. If a pulse is impressed on the designated input terminals such that pin 6 goes negative, a negative potential will be inductively coupled to pin 7 on the secondary. Inasmuch as the secondary is connected between the bases of transistors Q1 and Q2, the base potential of transistor Q1 will begin to rise with respect to the base potential of transistor Q2. The time constant of the base circuit defined by capacitor C2 and resistor R6 holds the base potential of transistor Q2 essentially constant. As a consequence of the transistor Q1 base potential rising, the transistor Q1 emitter potential will also rise and a point will be reached at which transistor Q2 begins to conduct. In this momentary transition period both transistors Q1 and Q2 are conducting simultaneously. As transistor Q2 comes on, current begins to flow through the transistor Q2 emitter resistor R2 thereby preventing the emitter potential from rising further. Current of course also begins to flow through the collector of transistor Q2 and through resistor R5 and to ground thereby raising the collector potential of transistor Q2. As the transistor Q2 collector potential rises, the transistor Q1 base potential also rises coupled through C1 and R4 and reaches a level above the transistor Q1 emitter potential thereby cutting off transistor Q1. In order to speed up the transition between states, capacitor C1 is used to bypass resistor R4 so that the positive going voltage on the collector of transistor Q2 is immediately fed back to the base of transistor Q1.

When transistor Q2 is conducting, the voltage at the base of transistor Q1 resides sufficiently high to drive current through diode CR1 and the secondary of transformer T1 to the base of transistor Q2, thereby maintaining a fixed voltage drop (approximately 0.5 volt across diode CR1) from the base of the nonconducting transistor to the base of the conducting transistor. In this state, transistor Q3 is not cut off and current passes from the base of transistor Q3, through resistors R7 and R8 and from the collector of transistor Q3 through the resistor R9 thereby maintaining the collector voltage near ground. Accordingly, the output which is taken where indicated at the collector of transistor Q3 is now representative of the false state.

In order to trigger the sense amplifier from the false state back to the true state, it is necessary that a pulse be impressed on the designated input terminals such that pin 6 goes positive which in turn will pulse pin 7 on the secondary positive. Consequently, the base potential of transistor Q1 will begin to drop with respect to the base potential of transistor Q2, the base of transistor Q2 being held essentially constant by C2. As the base of transistor Q1 drops, a point will be reached at which transistor Q1 begins to conduct. As emitter-collector current through transistor Q1 begins to flow, the voltage drop across resistor R2 increases until an emitter potential is established at a level such that transistor Q2 is cut off, as previously noted.

From the foregoing, it should be appreciated that if a first positive pulse at *t1* on pin 6 drives transistor Q1 on, a second positive pulse at *t2* on pin 6 (in the absence of any intervening pulse) would have no effect on the circuit. More particularly, as long as positive pulses are impressed on pin 6, transistor Q1 will continue to conduct. It is only when pin 6 goes negative at *t3* after previously having been positive that conduction is shifted to transistor Q2. Conversely, when pin 6 goes positive at *t4*, after previously having been negative, conduction is shifted to transistor Q1.

It has been seen that the paralleled diodes CR1 and CR2 have been connected in series between the bases of transistors Q1 and Q2 to establish a constant voltage drop between the bases equal to the forward drop (0.5 volt) caused by current conduction therethrough. The 0.5 volt drop caused by the diodes CR1 and CR2 establishes a discrimination level serving to prevent spurious noise pulses from triggering the circuit. For example, a pulse of |0.175| volts amplitude at the input terminals is stepped up by T1 to approximately 0.44 volt in the secondary which of course is insufficient to reverse the normal 0.5 volt drop between the bases of transistors Q1 and Q2. On the other hand, pulses greater than 0.2 volt amplitude are transformed to above 0.5 volt which level of course exceeds the diode drop between the bases of transistors Q1 and Q2 to trigger the circuit. It will be realized that if it is desirable to change the discrimination level of the circuit, a different turns ratio may be employed.

Although, as indicated, the discrimination level is 0.20 volt where the forward diode drop is 0.50 volt, in practice, due to component tolerances, there is a band between .175 volt and .225 volt in which appropriate rejection and triggering is not assured. It is desirable to make this band as narrow as possible and symmetric on either side of the nominal triggering voltage. Because the discrimination is established not by the difference between cut off and conduction of a diode but rather by the forward drop across a conducting diode for a given current, a uniform triggering level for pulses of either polarity is assured.

Diodes CR3 and CR4 are included in the circuit to keep transistor Q2 out of saturation. Likewise, diode CR5 keeps transistor Q1 out of saturation while resistor R8 and diode CR6 keep transistor Q3 out of saturation.

It will therefore be seen that the above circuit converts A.-C. bipolar pulses to D.-C. logical levels and utilizes only a minimum of equipment, all of which is substantially conventional. As noted, the triggering techniques employed assure uniform triggering levels for pulses of either polarity and permits rather close discrimination so as to prevent triggering by spurious noise pulses.

The foregoing is considered as illustrative only of the principles of the invention, it being understood that the indicated quantitative values are shown for exemplary purposes only. Since numerous modifications will readily occur to persons skilled in the art, it is not desired to limit the invention to the exact circuitry and operation shown and described and accordingly all suitable modifications and equivalents are intended to fall within the scope of the invention as claimed.

The following is claimed as new:

1. A bistable state circuit comprising:

first and second switching devices each including a current input electrode, a current output electrode, and a control electrode;

first means interconnecting said control electrodes including a pair of oppositely poled diodes connected directly in parallel with each other;

a potential source;

means coupling said potential source to said first and second switching devices for conducting current between the input and output electrodes thereof;

means responsive to said first switching device conducting current for driving a current through said pair of diodes in a first direction from the control electrode of said first switching device to the control electrode of said second switching device;

means responsive to said second switching device conducting current for driving a current through said pair of diodes in a second direction from the control electrode of said second switching device to the control electrode of said first switching device;

means interconnecting said input electrodes of said first and second switching devices;

means for causing current conduction in said first switching device and for inhibiting current conduction in said second switching device in response to the voltage drop between the control and input electrodes of said first switching device exceeding the voltage drop between the control and input electrodes of said second switching device and for causing current conduction in said second switching device and for inhibiting current conduction in said first switching device in response to the voltage drop between the control and input electrodes of said second switching device exceeding the voltage drop between the control and input electrodes of said first switching device; and source means connected in series with said pair of diodes for selectively developing pulses of first and second polarities.

2. A bistable state circuit comprising:

first and second transistors each including an emitter, a collector, and a base;

first means interconnecting said bases including a pair of oppositely poled diodes connected directly in parallel with each other;

a potential source;

means coupling said potential source to said first and second transistors for conducting current between the emitters and collectors thereof;

means responsive to said first transistor conducting current for driving a current through said pair of diodes in a first direction from the base of said first transistor to the base of said second transistor;

means responsive to said second transistor conducting current for driving a current through said pair of diodes in a second direction from the base of said second transistor to the base of said first transistor;

means interconnecting said emitters of said first and second transistors;

means for causing current conduction in said first transistor and for inhibiting current conduction in said second transistor in response to the voltage drop between the base and emitter of said first transistor exceeding the voltage drop between the base and emitter of said second transistor and for causing current conduction in said second transistor and for inhibiting current conduction in said first transistor in response to the voltage drop between the base and emitter of said second transistor exceeding the voltage drop between the base and emitter of said first transistor; and source means connected in series with said pair of diodes for selectively developing pulses of first and second polarities.

3. The combination of claim 2 wherein said source means includes a transformer secondary winding.

4. A bistable state circuit comprising:

first and second transistors each including an emitter, a collector, and a base;

first means interconnecting said bases including a pair of oppositely poled diodes connected directly in parallel with each other;

a potential source;

means coupling said potential source to said first and second transistors for conducting current between the emitters and collectors thereof;

means responsive to said first transistor conducting current for driving a current through said pair of diodes in a first direction from the base of said first transistor to the base of said second transistor;

means responsive to said second transistor conducting current for driving a current through said pair of diodes in a second direction from the base of said second transistor to the base of said first transistor;

means interconnecting said emitters of said first and second transistors;

means for causing current conduction in said first transistor and for inhibiting current conduction in said second transistor in response to the voltage drop between the base and emitter of said first transistor exceeding the volatge drop between the base and emitter of said second transistor and for causing current conduction in said first transistor in response to the voltage drop between the base and emitter of said second transistor exceeding the voltage drop between the base and emitter of said first transistor;

source means connected in series with said pair of diodes for selectively developing pulses of first and second polarities;

a third transistor including an emitter, a collector, and a base;

a second potential source;

impedance means connecting said first transistor collector to said second potential source; and means coupling said third transistor base to said impedance means for controlling said third transistor in response to said first transistor.

5. In a bistable state circuit including first and second transistors each having an emitter, a collector, and a base and wherein means interconnecting said transistors is provided for inhibiting conduction in said first transistor when said second transistor conducts and for inhibiting conduction in said second transistor when said first transistor conducts, the improvement including:

oppositely poled diodes connected in parallel between the bases of said first and second transistors;

means responsive to said first transistor conducting current for driving a current through said pair of diodes in a first direction from the base of said first transistor to the base of said second transistor;

means responsive to said second transistor conducting current for driving a current through said pair of diodes in a second direction from the base of said second transistor to the base of said first transistor;

means interconnecting said emitters of said first and second transistors; and source means connected in series with said pair of diodes for selectively developing pulses of first and second polarities.

References Cited by the Examiner

UNITED STATES PATENTS

| | | | |
|---|---|---|---|
| 2,760,087 | 8/56 | Felker | 307—88.5 |
| 2,874,293 | 2/59 | McMurren | 307—88.5 |
| 2,949,549 | 8/60 | Hoge | 307—88.5 |
| 2,997,602 | 8/61 | Eachus | 307—88.5 |
| 2,999,173 | 9/61 | Ruck | 307—88.5 |

OTHER REFERENCES

Hurley: Junction Transistor Electronics, Wiley & Sons, 1958, Second Printing September 1959 (pages 48, 75, 84, 85, 384, 392 and 413 relied on).

ARTHUR GAUSS, *Primary Examiner.*

GEORGE N. WESTBY, JOHN W. HUCKERT, *Examiners.*